Patented June 13, 1944

2,351,259

UNITED STATES PATENT OFFICE 2,351,259

METHOD OF CONDITIONING WATER

Charles T. Fuetterer, Cuyahoga Falls, Ohio

No Drawing. Application October 29, 1941,
Serial No. 416,993

23 Claims. (Cl. 210—23)

My invention relates to a method of conditioning water and more particularly to an improved method in which the water is treated with a material capable of forming a colloidal aqueous solution.

In conditioning water, the primary purpose in some cases is to remove hardening agents which may form objectionable precipitates in apparatus in which the water is heated, such as feed water heaters or boilers, or for purposes in which the water is better suited for use when the hardening agents are removed, such as for laundry or domestic use. In other cases, the primary purpose is to clarify the water for drinking or municipal use. My improved process is not limited to any particular use as it is effective in either reducing the hardness or removing suspended or colloidal matter from water, including elements or compounds present in the water, either in solution or suspension, which affect the color, odor or taste.

In the usual method of softening water, it is the practice to treat the water with lime or soda ash, or a mixture thereof, preferably with agitation, to remove the usual hardening agents, such as calcium or magnesium, that are present. In hard water, calcium and magnesium are usually present in the form of bicarbonates, chlorides, sulphates, or the calcium may even be present in the form of calcium hydroxide. When lime is added to water, it reacts with the calcium and magnesium bicarbonates and also with the magnesium sulphate and chloride, and a solid precipitate is formed composed principally of calcium carbonate and magnesium hydroxide. The soda ash reacts with calcium sulphate, calcium chloride and even lime to also precipitate calcium carbonate. The reactions which take place and the composition of the precipitate of course varies depending upon the temperature and concentration of the precipitating ion or ions. After the precipitate is formed, it is permitted to settle and the clarified water is drawn therefrom and preferably filtered, or the sediment may be withdrawn from the tank or apparatus in which the water is softened.

In the usual clarification processes, it has been the practice to add an alum, aluminum sulphate, or an iron salt, such as ferrous or ferric sulphate or ferric chloride to effect precipitation or coagulation of the suspended matter which is permitted to settle and is removed in the manner specified for softening water.

In Patent No. 2,097,876 granted to me on November 2, 1937, a process of conditioning water is disclosed in which a carbohydrate is added to water with lime or a sodium salt, or both, for conditioning water, the carbohydrate being effective in increasing the rate at which precipitation is effected.

I have now made the discovery that if a material comprising a protein, a gum, or a mixture thereof, which is capable of forming a colloidal solution in water, is added in certain well-defined proportions to water, the material is effective by itself in sensitizing electrically charged particles in the form of hardening agents, colloidal or suspended matter, so that the precipitation of hardening agents is hastened and rendered more effective by the usual softening agents and the coalescence of colloidal and suspended matter is hastened and rendered more effective by the usual coagulating agents. Preferably, however, the material containing the protein, gum, or mixture thereof, is introduced into the water to be conditioned in the presence of a water softening or coagulating agent. My invention also contemplates treating the water with a material comprising a protein, a gum, or a mixture thereof, which has the property of forming a colloidal aqueous solution in combination with a carbohydrate which has similar properties in the presence of a water softening or coagulating agent.

It is therefore an object of my invention to provide an improved process of conditioning water in which the water is treated with a material comprising a protein, a gum, or a mixture thereof, which material is capable of forming a colloidal aqueous solution.

Another object of my invention is to provide an improved process of conditioning water in which the water is treated with a material comprising a protein, a gum, or a mixture thereof, which material is capable of forming an aqueous colloidal solution, in combination with one or more of the usual water softening agents.

A further object of my invention is to provide an improved process of conditioning water containing suspended matter in which the water is treated with a material comprising a protein, a gum, or a mixture thereof, which material is capable of forming a colloidal aqueous solution.

Another object of my invention is to provide an improved process of conditioning water in which the water is treated with a material comprising a protein, a gum, or a mixture thereof, which material is capable of forming a colloidal aqueous solution, in the presence of one or more coagulating agents.

A still further object of my invention is to provide an improved process of conditioning water in which the water is treated with a material comprising a protein, a gum, or a mixture thereof, which material is capable of forming a colloidal aqueous solution, and a carbohydrate capable of forming a colloidal aqueous solution, in the presence of one or more softening agents.

The water to be conditioned by my improved process may be of any type, such as water containing one or more hardening agents, river water, sewage, waste water from industrial plants or the like and it may be conditioned for any desirable use, such as for industrial, domestic or municipal purposes. The water may be clarified or softened, or both, by my improved process in any desired manner, such as by the hot or cold continuous, semi-continuous, or batch processes. My improved process is also effective in removing the taste, color and odor from water.

In softening water containing calcium, magnesium or other hardening material by my improved process, the material comprising the protein, gum, or mixture thereof, may be added directly to the water in a finely divided solid state or as a paste like suspension or colloidal solution in water. The water is then agitated in the usual manner and the calcium or other hardening agent is sensitized in such a manner that the precipitation of the hardening agents by the usual softening agents is hastened and rendered more complete. The exact reason for this is not definitely known. It is believed, however, that in commercial water containing a hardening agent in solution, colloidal complexes may be present in supersaturated solution or colloidal complexes may form during the reaction between the hardening agents and the softening agent which retard the removal of precipitated solids. When a material comprising a protein, a gum, or a mixture thereof, is present, however, in certain well defined proportions, it sensitizes the colloidal complexes and renders them ineffective to retard the reaction between the hardening agent and the softening agent. The material utilized must be capable of forming a colloidal solution in water and may be composed entirely or partially of protein, gum, or a mixture thereof. Proteins which I have found to be suitable for this purpose are gelatin, crystalline egg albumen, oxyhemoglobin, and meal ground from the seeds of various plants, such as soy beans, kidney or castor beans, peas, cow peas, barley, rye or the like. Gums which have been found satisfactory are agar agar, gum arabic, gum acacia, locust bean gum, tragacanth gum and senegal gum. The gums specified are naturally occurring gums and may or may not contain protein. Some of them do contain protein, such as agar agar.

The amount of material containing the protein, gum, or mixture thereof utilized in the process is usually determined by the trial and error method upon a sample of water to be treated and may vary from more than incidental impurities up to an amount determined by its gold number test. Generally, however, the amount of protein, gum, or mixture thereof, which is utilized will be considerably less than its gold number test and preferably varies from .0001 to .5 part per million in accordance with the sensitizing effect of the particular colloid or mixture of colloids which is utilized; in other words, the amount of the colloid or mixture of colloids which is added should be sufficient to hasten and render more effective the precipitation of hardening agents by the usual softening agents than when the softening agents are utilized by themselves and to hasten and render more effective the coagulation of suspended or colloidal matter by the usual coagulating agents than when the coagulating agents are utilized by themselves. The amount of the colloid or mixture of colloids which is added, however, should not be sufficient to retard the precipitation of hardening agents by means of the usual softening agents or to retard the coalescence of colloidal or suspended matter by means of the usual coagulating agents.

The method of determining the gold number test of a material capable of forming a colloidal aqueous solution is well known in the art and may be made by preparing a 10 cubic centimeter standard colloidal gold solution in an alkaline medium. Under ordinary conditions the gold solution has a red color but the addition of 1 cubic centimeter of a 10% sodium chloride solution changes the color of the gold solution from red to blue. If a sufficient amount of a material, such as a protein, gum, carbohydrate, or a mixture thereof, which forms a colloidal aqueous solution is added to the gold solution, however, it prevents this change of color and the proportion of the least amount of material required to prevent change of color to the 10 cubic centimeter solution is the gold number. The amount of colloidal material added to the water to be conditioned should never exceed in proportion to the quantity of water being treated, the amount of the same colloidal material which it is necessary to add to a ten cubic centimeter alkaline gold solution to prevent change in color upon the addition of one cubic centimeter of a ten per cent sodium chloride solution as in such case it exceeds the gold number and stabilizes the colloidal or suspended matter in the water and is harmful.

While the hardening agents in water may be sensitized by treating it with a material comprising a protein, a gum, or a mixture thereof, which is capable of forming a colloidal solution, in the proportions specified without the addition of a softening agent, and this is particularly true if the hardening agent is present in the form of a suspension or colloidal solution, to precipitate the hardening agent or agents I treat the water with the material comprising the protein, gum, or mixture thereof, in the presence of one or more of the usual softening agents, or in the presence of one or more of the usual softening agents and a carbohydrate which forms a colloidal solution in water, such as starch or dextrin. In such cases, I have found that the material comprising the protein, gum, or mixture thereof, is effective in expediting the softening of the water and in this respect acts as a catalytic agent.

As previously stated, the hardness of such water is caused principally by the presence of calcium and magnesium which are generally present in the form of bicarbonates, sulphates and chlorides. The calcium and magnesium bicarbonates, sulphates and chlorides may be precipitated by the addition of an alkaline earth metal oxide, such as lime, or an alkaline earth metal hydroxide, such as slacked lime, although many of the hardening agents may be precipitated by means of the other alkaline earth metal oxides or hydroxides, such as barium or strontium oxides or hydroxides. For the precipitation of calcium sulphate, chlorides, or even calcium hydroxide which is present or which does not enter into reaction, an alkali metal compound, such as potassium or sodium carbonate may be employed, sodium carbonate in the form of soda ash being preferred because it is more economical. The amount of softening agent or agents which are added are usually determined by trial and error upon a sample of the water to be treated.

I have found that in softening water with an alkaline earth metal oxide, such as lime, or lime and an alkali metal compound, such as soda ash, the time of softening will be materially expedited if a material comprising a protein, a gum, or a mixture thereof, which material forms an aqueous colloidal solution, is present in proportions ranging from more than incidental impurities up to that amount which will sensitize colloidal or suspended matter in the water without stabilizing it. This amount in proportion to the quantity of water being treated is usually substantially below the proportionate amount required to prevent change of color in a 10 cc. alkaline colloidal gold solution when 1 cc. of a 10% sodium chloride solution is added thereto. The reason for this is not definitely known. It is believed, however, that the material comprising the protein, gum, or mixture thereof, is effective in causing a rapid settling of the precipitate, thereby taking it out of the sphere of the reaction. It is effective also in causing precipitation of hardening agents which are in suspension or colloidal solution. The water hardening material is also more completely removed with a less amount of the softening agent or agents, and matter, such as silica, which is present in colloidal solution or suspension may be wholly or partially removed. The protein, gum, or mixture thereof, therefore acts as a catalytic agent.

In general, the addition of a catalyzer comprising a protein, gum, or a mixture thereof, of the type specified is satisfactory in combination with the usual softening or coagulating agents for conditioning most water and is more economical and effective to use than a carbohydrate because it has a lower gold number test. In removing hardness from water of certain types, however, I have found it desirable to utilize the combination of a material comprising a protein, gum, or a mixture thereof, and a carbohydrate, both, or all, of which are capable of forming a colloidal solution in water. The proportion of protein, gum, or mixture thereof, to the carbohydrate in the catalyzer may be varied in any desirable proportions as each is effective in expediting the reaction and the proportion of catalyzer which is added to the water may be varied from more than incidental impurities up to that amount which will sensitize colloidal or suspended matter in the water without stabilizing it. The best proportion within this range may be determined by the trial and error method and generally will range from approximately .0001 to .5 part per million depending upon the sensitizing effect of the particular colloid or combination of colloids which is utilized.

My improved catalyzer may also be utilized for the clarification of water containing suspended matter, such as sewage, river water or waste water from industrial plants in the presence of coagulating agents. In clarifying such water, it is usually the practice to add a coagulating agent, such as an alum, aluminum sulphate, or an iron salt, such as ferrous or ferric sulphate or ferric chloride. When a material comprising a protein, gum, or mixture thereof, capable of forming a colloidal aqueous solution is mixed with water containing a coagulating agent, the coagulation proceeds much more rapidly. The preferred amount of material comprising a protein, gum, or mixture thereof, to be added for a particular water may be determined by the trial and error method and is approximately that amount which will sensitize colloidal matter present without shielding it against added coagulant charge. Any amount that is capable of producing a sensitizing effect may be utilized and will vary from more than incidental impurities up to but not exceeding that amount at which additional colloidal matter added will produce a stabilizing effect upon the colloidal or suspended matter in the water. Such a stabilizing effect is always produced when a sufficient amount of the colloidal matter is added which is proportionate, considering the quantity of water being treated, to that utilized in just preventing change of color in 10 cc. of an alkaline colloidal gold solution to which 1 cc. of a 10% sodium chloride solution is added. By utilizing a material comprising a protein, gum, or mixture thereof, having the characteristics specified in combination with a coagulating agent, I am able not only to effect more rapid coagulation but the coagulation is more complete and any color, taste or odor in the water is more effectively removed than when the coagulating agent is utilized alone. While I do not desire to be limited to any particular theory that now prevails or may be later advanced, it is believed that the protein or gum, when added in sensitizing amounts, partially nulls the natural colloid particle charge, whereas when it is added in larger amounts, it shields the colloidal material against added coagulant charge. It has been amply demonstrated, however, that when a material comprising a protein, gum, or mixture thereof, which forms a colloidal aqueous solution, is added to water in an amount ranging from incidental impurities up to that amount which causes stabilization of suspended or colloidal matter in the water, it will sensitize colloidal or suspended matter and will expedite the coagulation of such colloidal and suspended matter in the presence of the usual coagulating agents.

The following specific example will serve to illustrate my process. A sample of water was taken from the Little Cuyahoga river at Akron, Ohio, and from an analysis, it was found to contain calcium and other inorganic salts in solution. It had 30 parts color, contained organic material in colloidal solution and in suspension and had a distinct taste and odor. Gum arabic was added in the proportion of .001 of a pound per thousand gallons of water and the mixture was agitated for approximately two minutes in a laboratory mixer. Aluminum sulphate was then added to the water in the proportion of approximately .25 of a pound per thousand gallons of water and agitation of the mixture was continued until clarification was completed. A similar test was also made with another sample of the same water without adding the gum arabic. From the tests, it was found that when the gum was added, the clarification was about four times as rapid as when aluminum sulphate alone was utilized, the color was reduced to six parts, taste and odor were practically absent and some of the hardening agents were removed, whereas when aluminum sulphate alone was utilized, approximately 15 parts of color and some taste and odor remained.

In utilizing my improved catalyzer in combination with a coagulating agent in the clarification of water, I find it desirable to first add the catalyzer, such as one of those specified, in a finely divided state, or as a suspension or colloidal solution in water, agitate the water, and then add the coagulating agent and continue the agitation until the coagulation is completed. The coagulated material settles to the bottom of the treating container and the clarified water may be filtered to remove any trace of coagulated suspended matter. An example of apparatus for utilizing a continuous method is disclosed in my prior patent to which reference has been made.

In clarifying water by my improved method, another distinct advantage resides in the fact that clarification of the water may be effected over a wider range of hydrogen ion concentration than in the usual process. In clarifying water with a coagulating agent of the type mentioned, such as aluminum sulphate, it is necessary to maintain the pH concentration in a very narrow range, such as between 6.7 and 6.9, whereas when a protein of the type specified is utilized in combination with the coagulating agent, the pH concentration may vary over a much larger range, such as from 3.6 to 8.0. The clarification is also more complete or the same degree of clarification may be obtained with a less amount of the coagulating agent than when the coagulating agent is utilized alone.

What I claim is:

1. In the process of conditioning water containing an objectionable hardening agent in solution, the steps which comprise adding to the water a softening agent and a material comprising a protein capable of forming a colloidal aqueous solution, and agitating the water, said softening agent being present in an amount sufficient to react with at least a major proportion of said hardening agent to form an insoluble precipitate, said material being free from ingredients which absorb and ingredients which adsorb the protein in the presence of water, and said protein being of such nature and being added in such amount that it hastens the reaction between the hardening agent and the softening agent.

2. In the process of conditioning water containing an objectionable hardening agent in solution, the steps which comprise adding to the water a softening agent and a material comprising a gum capable of forming a colloidal aqueous solution, and agitating the water, said softening agent being present in an amount sufficient to react with at least a major proportion of said hardening agent to form an insoluble precipitate and said gum being of such nature and being added in such amount that it will hasten the reaction between the hardening agent and the softening agent.

3. In the process of conditioning water containing an objectionable hardening agent in solution, the steps which comprise adding to the water a softening agent and a material comprising a gum and a protein, and agitating the water, said protein and gum each being capable of forming a colloidal aqueous solution and each being present in an amount greater than incidental impurities, said softening agent being present in an amount sufficient to react with at least the major proportion of said hardening agent to form an insoluble precipitate, and the combined gum and protein content being of such nature and being added in such amount that it will hasten the reaction between the hardening agent and the softening agent.

4. In the process of conditioning water containing an objectionable hardening agent in solution, the steps which comprise adding to the water a softening agent and a material comprising a protein and a carbohydrate, and agitating the water, said protein and carbohydrate each being capable of forming a colloidal aqueous solution and each being present in an amount greater than incidental impurities, said softening agent being present in an amount sufficient to react with at least the major proportion of said hardening agent to form an insoluble precipitate, and the combined protein and carbohydrate content being of such nature and being added in such amount that it hastens the reaction between the hardening agent and softening agent.

5. In the process of conditioning water containing an objectionable hardening agent in solution, the steps which comprise adding to the water a softening agent and a material comprising a gum and a carbohydrate, and agitating the water, said gum and carbohydrate each being capable of forming a colloidal aqueous solution and each being present in an amount greater than incidental impurities, said softening agent being present in an amount sufficient to react with at least the major proportion of said hardening agent to form an insoluble precipitate, and the combined gum and carbohydrate content being of such nature and being added in such amount that it hastens the reaction between the hardening agent and softening agent.

6. In the process of conditioning water containing an objectionable hardening agent in solution, the steps which comprise adding to the water a softening agent and a material comprising a protein, gum and carbohydrate, and agitating the water, said protein, gum and carbohydrate each being capable of forming a colloidal aqueous solution and each being present in an amount greater than incidental impurities, said softening agent being present in an amount sufficient to react with a major proportion of said hardening agent to form an insoluble precipitate and the combined protein, gum and carbohydrate content being of such nature and being added in such amount that it hastens the reaction between the hardening agent and the softening agent.

7. In the process of conditioning water containing an objectionable hardening agent in solution which is reactive with lime, the steps which comprise adding to the water lime and a material comprising a substance capable of forming a colloidal aqueous solution selected from a group consisting of a protein and a gum, and agitating the water, said lime being present in an amount sufficient to react with at least a major proportion of said hardening agent to form an insoluble precipitate, said material being free from ingredients which absorb and ingredients which adsorb said substance in the presence of water, and said substance being of such nature and being added in such amount that it hastens the reaction between said lime and said hardening agent.

8. In the process of conditioning water containing objectionable hardening agents in solution, at least one of which is reactive with lime and one of which is reactive with sodium carbonate, the steps which comprise adding lime and sodium carbonate and a material comprising a substance capable of forming a colloidal aqueous solution selected from a group consisting of a protein and a gum, said lime and sodium carbonate being capable collectively of reacting with at least the major proportion of said hardening agents to form an insoluble precipitate, and said substance being of such nature and being added in such amount that it hastens the reaction between the lime and the hardening agent with which the lime is reactive and of hastening the reaction between the sodium carbonate and the hardening agent with which the sodium carbonate is reactive.

9. In the process of conditioning water containing objectionable colloidal matter and other coagulable impurities, the steps which comprise adding to the water a coagulating agent capable of coalescing the colloidal matter and coagulable impurities and a material comprising a protein capable of forming a colloidal aqueous solution, and agitating the water, said coagulating agent being present in an amount sufficient to coalesce at least the major proportion of said colloidal matter and coagulable impurities to form an insoluble precipitate, and said material being free from ingredients which absorb and ingredients which adsorb the protein in the presence of water and said protein being of such nature and being added in such amount that it hastens the action of the coagulating agent in coalescing the colloidal matter and other coagulable impurities.

10. In the process of conditioning water containing objectionable suspended matter and other coagulable impurities, the steps which comprise adding to the water a coagulating agent capable of coalescing the suspended matter and coagulable impurities and a material comprising a protein capable of forming a colloidal aqueous solution, and agitating the water, said coagulating agent being present in an amount sufficient to coalesce at least the major proportion of said suspended matter and other coagulable impurities to form an insoluble precipitate, said material being free from ingredients which absorb and ingredients which adsorb the protein in the presence of water, and said protein being of such nature and being added in such amount that it hastens the action of the coagulating agent in coalescing the colloidal matter and other coagulable impurities.

11. In the process of conditioning water containing objectionable colloidal matter, suspended matter, and other coagulable impurities, the steps which comprise adding to the water a coagulating agent capable of coalescing the colloidal matter, suspended matter and other coagulable impurities and a material comprising a protein capable of forming a colloidal aqueous solution, and agitating the water, said coagulating agent being present in an amount sufficient to coalesce at least the major proportion of said suspended matter, colloidal matter, and other coagulable impurities, to form an insoluble precipitate, said material being free from ingredients which absorb and ingredients which adsorb the protein in the presence of water, and said protein being of such nature and being added in such amount that it hastens the action of the coagulating agent in coalescing the colloidal matter, suspended matter and other coagulable impurities.

12. In the process of conditioning water containing objectionable colloidal matter and other coagulable impurities, the steps which comprise adding to the water a coagulating agent capable of coalescing the colloidal matter and other coagulable impurities and a material comprising a gum capable of forming a colloidal aqueous solution and agitating the water, said coagulating agent being present in an amount sufficient to coalesce at least the major proportion of said colloidal matter and impurities to form an insoluble precipitate, and said gum being of such nature and being added in such amount that it hastens the action of the coagulating agent in coalescing the colloidal matter and other coagulable impurities.

13. In the process of conditioning water containing objectionable suspended matter and other coagulable impurities, the steps which comprise adding to the water a coagulating agent capable of coalescing the suspended matter and coagulable impurities and a material comprising a gum capable of forming a colloidal aqueous solution and agitating the water, said coagulating agent being present in an amount sufficient to coalesce at least the major proportion of said suspended matter and other impurities to form an insoluble precipitate and said gum being of such nature and being added in such amount that it hastens the action of the coagulating agent in coalescing the colloidal matter and coagulable impurities.

14. In the process of conditioning water containing objectionable suspended matter, colloidal matter and other coagulable impurities, the steps which comprise adding to the water a coagulating agent capable of coalescing the suspended matter, colloidal matter and other coagulable impurities and a material comprising a gum capable of forming a colloidal aqueous solution and agitating the water, said coagulating agent being present in an amount sufficient to coalesce at least the major proportion of said suspended matter, colloidal matter and other impurities to form an insoluble precipitate, and said gum being of such nature and being added in such amount that it hastens the action of the coagulating agent in coalescing the colloidal matter and coagulable impurities.

15. In the process of conditioning water containing objectionable suspended matter, colloidal matter and other coagulable impurities, the steps which comprise adding to the water a coagulating agent capable of coalescing the suspended matter, colloidal matter and other coagulable impurities and a material comprising a protein and a gum, and agitating the water, said protein and gum each being capable of forming a colloidal aqueous solution and each being present in an amount greater than incidental impurities, said coagulating agent being present in an amount sufficient to coalesce at least the major proportion of said suspended matter, colloidal matter and coagulable impurities to form an insoluble precipitate, and the combined protein and gum content being of such nature and being added in such amount that it hastens the action of the coagulating agent in coalescing the suspended matter, colloidal matter and other coagulable impurities.

16. In the process of conditioning water containing colloidal matter and other coagulable impurities, the steps which comprise adding to the water a coagulating agent capable of coalescing the colloidal matter and coagulable impurities and a material comprising a protein and a carbohydrate, and agitating the water, said protein and carbohydrate each being capable of forming a colloidal aqueous solution and each being present in an amount greater than incidental impurities, said coagulating agent being present in an amount sufficient to coalesce at least the major proportion of said colloidal matter and other coagulable impurities to form an insoluble precipitate, and the combined protein and carbohydrate content being of such nature and being added in such amount that it hastens the action of the coagulating agent in coalescing the colloidal matter and other coagulable impurities.

17. In the process of conditioning water containing colloidal matter and other coagulable impurities, the steps which comprise adding to the water a coagulating agent capable of coalescing the colloidal matter and a material comprising a gum and a carbohydrate, and agitating the water, said gum and carbohydrate each being capable of forming a colloidal aqueous solution and each being present in an amount greater than incidental impurities, said coagulating agent being present in an amount sufficient to coalesce at least the major proportion of said colloidal matter and other coagulable impurities to form an insoluble precipitate, and the combined gum and carbohydrate content being of such nature and being added in such amount that it hastens the action of the coagulating agent in coalescing the colloidal matter and other coagulable impurities.

18. In the process of conditioning water containing suspended matter and other coagulable impurities, the steps which comprise adding to the water a coagulating agent capable of coalescing the suspended matter and other coagulable impurities and a material comprising a protein and a carbohydrate, and agitating the water, said protein and carbohydrate each being capable of forming a colloidal aqueous solution and each being present in an amount greater than incidental impurities, said coagulating agent being present in an amount sufficient to coalesce at least the major proportion of said suspended matter and other coagulable impurities to form an insoluble precipitate, and the combined protein and carbohydrate content being of such nature and being added in such amount that it hastens the action of the coagulating agent in coalescing the colloidal matter and other coagulable impurities.

19. In the process of conditioning water containing suspended matter and other coagulable impurities, the steps which comprise adding to the water, a coagulating agent and a material comprising a gum and a carbohydrate, and agitating the water, said gum and carbohydrate each being capable of forming a colloidal aqueous solution and each being present in an amount greater than incidental impurities, said coagulating agent being present in an amount sufficient to coalesce at least the major proportion of said colloidal matter and other coagulable impurities to form an insoluble precipitate, and the combined gum and carbohydrate content being of such nature and being added in such amount that it hastens the action of the coagulating agent in coalescing the colloidal matter and other coagulable impurities.

20. In the process of conditioning water containing colloidal matter, suspended matter and other coagulable impurities, the steps which comprise adding to the water a coagulating agent capable of coalescing the colloidal matter, suspended matter and other coagulable impurities and a material comprising a protein, a gum and a carbohydrate, and agitating the water, said protein, gum and carbohydrate each being present in an amount greater than incidental impurities, said coagulating agent being present in an amount sufficient to coalesce at least the major proportion of the colloidal matter, suspended matter and other coagulable impurities to form an insoluble precipitate, and the combined protein, gum and carbohydrate content being of such nature and being added in such amount that it hastens the action of the coagulating agent in coalescing the colloidal matter, suspended matter and other coagulable impurities.

21. In the process of conditioning water containing colloidal matter and other coagulable impurities, the steps which comprise adding to the water an aluminum sulphate and a material comprising a substance capable of forming a colloidal aqueous solution selected from a group consisting of a protein and a gum, and agitating the water, said aluminum sulphate being present in an amount sufficient to coalesce at least the major proportion of said colloidal matter and other coagulable impurities to form an insoluble precipitate, and said material being free from ingredients which absorb and ingredients which adsorb said substance in the presence of water, and said substance being of such nature and being added in such amount that it hastens the action of the aluminum sulphate in coalescing the colloidal matter and other coagulable impurities.

22. In the process of conditioning water containing suspended matter and other coagulable impurities, the steps which comprise adding to the water an aluminum sulphate and a material comprising a substance capable of forming a colloidal aqueous solution selected from a group consisting of a protein and a gum, and agitating the water, said aluminum sulphate being present in an amount sufficient to coalesce at least the major proportion of said suspended matter and other coagulable impurities to form an insoluble precipitate, said material being free from ingredients which absorb and ingredients which adsorb said substance in the presence of water, and said substance being of such nature and being added in such amount that it hastens the action of the aluminum sulphate in coalescing the suspended matter and other coagulable impurities.

23. In the process of conditioning water containing colloidal matter, suspended matter, and other coagulable impurities, the steps which comprise adding to the water an aluminum sulphate and a material comprising a substance capable of forming a colloidal aqueous solution selected from a group consisting of a protein and a gum, and agitating the water, said aluminum sulphate being present in an amount sufficient to coalesce at least the major proportion of said suspended matter and other coagulable impurities to form an insoluble precipitate, said material being free from ingredients which absorb and ingredients which adsorb said substance in the presence of water, and said substance being of such nature and being added in such amount that it hastens the action of the aluminum sulphate in coalescing the colloidal matter, suspended matter and other coagulable impurities.

CHARLES T. FUETTERER.